United States Patent [19]

Berg

[11] Patent Number: 4,927,696

[45] Date of Patent: May 22, 1990

[54] MATERIAL FOR USE IN FABRICATION

[76] Inventor: Louis K. Berg, Box 51, Sedalia, Alberta, Canada, T0J 3C0

[21] Appl. No.: 225,542

[22] Filed: Jul. 28, 1988

[51] Int. Cl.⁵ .............................. B32B 3/02
[52] U.S. Cl. .................. 428/195; 428/537.1; 428/537.5; 428/537.7; 52/105
[58] Field of Search .............. 52/105; 428/195, 537.1, 428/537.5, 537.7

[56] References Cited

U.S. PATENT DOCUMENTS

| | | | |
|---|---|---|---|
| 2,002,303 | 5/1935 | Walper | 52/105 |
| 2,187,087 | 1/1940 | Leary | 52/105 |
| 2,245,133 | 6/1941 | Hopkins | 52/105 |
| 2,270,419 | 1/1942 | Debo | 52/105 |
| 3,353,315 | 11/1967 | Barker | 428/167 |
| 3,477,184 | 11/1969 | Johnson et al. | 52/105 |

FOREIGN PATENT DOCUMENTS

| | | | |
|---|---|---|---|
| 685455 | 4/1964 | Canada . | |
| 1106168 | 8/1981 | Canada | 33/128 |
| 1152740 | 8/1983 | Canada | 33/116 |
| 0617242 | 5/1980 | Switzerland . | |

*Primary Examiner*—Patrick Ryan
*Attorney, Agent, or Firm*—Davis, Bujold & Streck

[57] ABSTRACT

Material for use in fabrication having reference markings spaced uniformly such that the markings can be used for measurement.

4 Claims, 4 Drawing Sheets

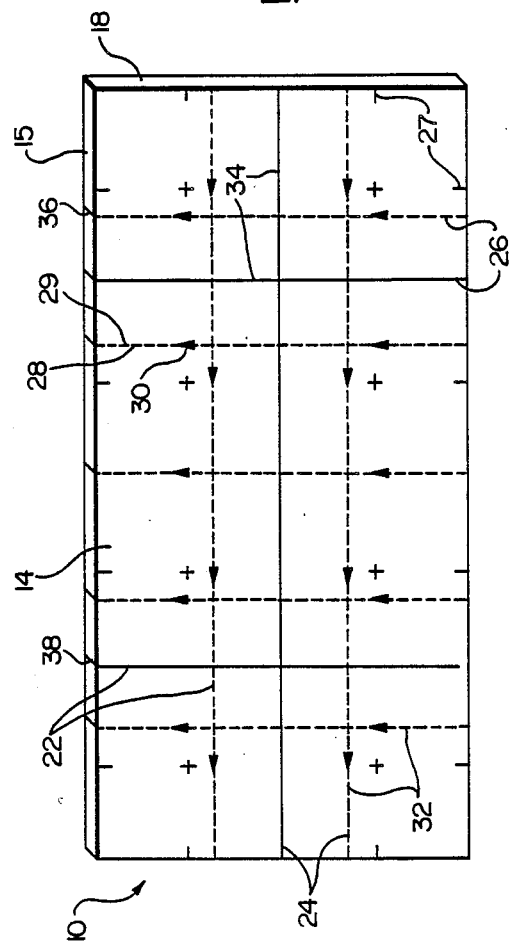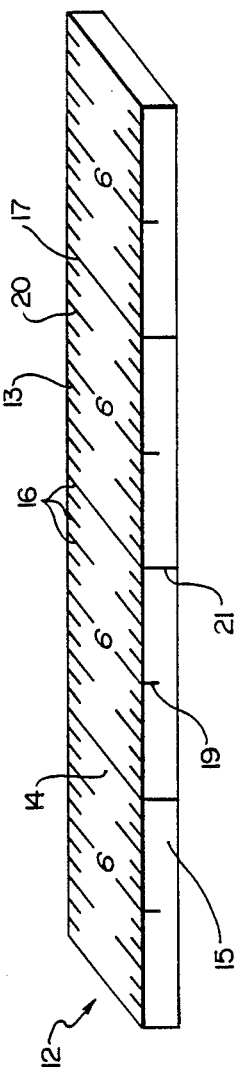

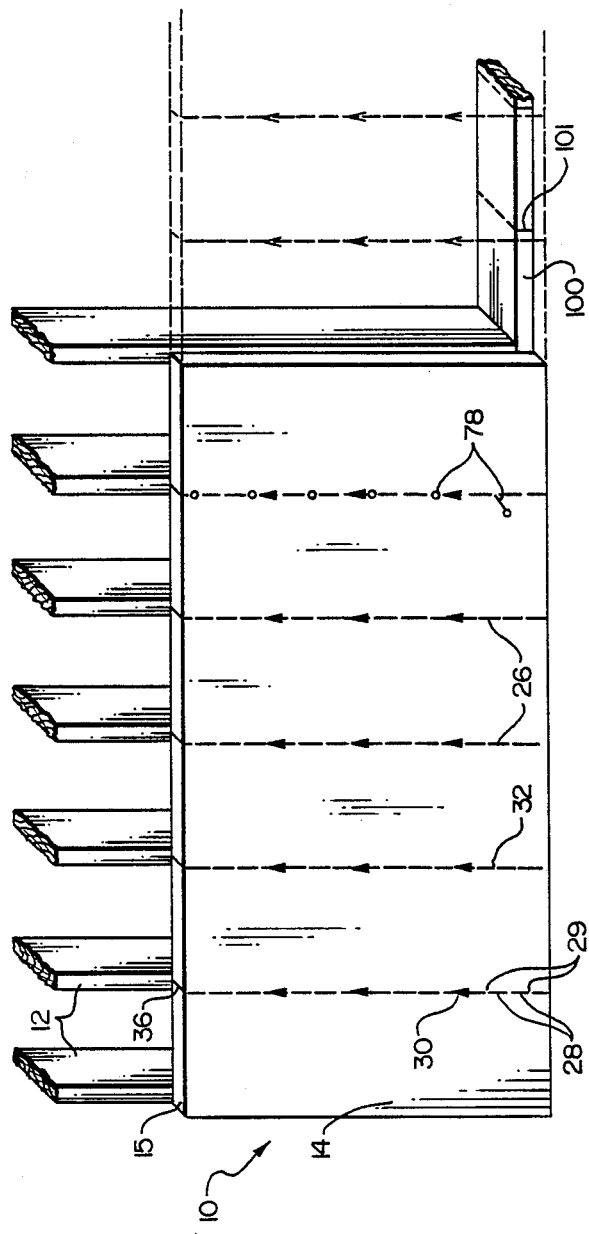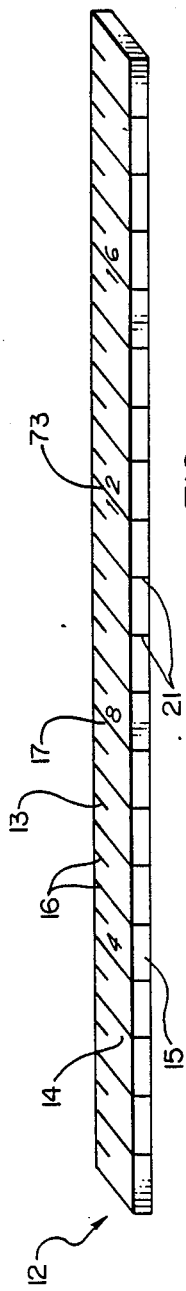

MATERIAL FOR USE IN FABRICATION

The present invention relates to materials for use fabrication.

BACKGROUND OF THE INVENTION

In every manufacturing industry materials of various types are fabricated to form products. The industries themselves are extremely diverse, ranging from the garment making industrY to the construction industry. The common element in all of these industries is the handling of the materials. The materials must be measured, marked and then cut to the correct size. It is a common convention to check every measurement before cutting as an incorrect cut can result in material becoming unusable. The greatest cost component is most fabrication applications is the cost of labour. The described measuring and marking is understandably time consuming and labour intensive.

SUMMARY OF THE INVENTION

What is required is material for use in fabrication which will reduce the need for measurement or marking and consequently save time and eliminate the potential for human error.

According to the present invention there is provided, in combination, material intended for use in fabrication; and reference markings on the material spaced uniformly such that the markings can be used for measurement.

The nature and extent of the markings depend upon the intended application for the materials. It is preferred that sheet materials have markings which indicate longitudinal and transverse dimensions on a common side. It is preferred that linear material have markings which indicate longitudinal dimensions on adjacent sides.

Although beneficial results may be obtained from using the material described, even more beneficial results may be obtained if the longitudinal and transverse reference markings form a grid such that the location of any point on one side of the material may be ascertained with reference to the longitudinal and transverse reference markings.

Although beneficial results may be obtained by using the materials described, even more beneficial results may be obtained if units of measurement are clearly marked. This is accomplished by the preferred feature of having one or more of the markings ruled into fractional and composite units of measure; such as inches and feet.

Although beneficial results may be obtained by using the material described above, even more beneficial results may be obtained if a system is used to signify fractional and composite markings. This may be accomplished in many ways, one of which is by having the ruled markings as dashes of uniform size separated by spaces of equal size, the size of the dashes conforming to a fractional unit of measure; and having arrows at uniform intervals, the distance between the arrows conforming to a composite unit of measure.

Although beneficial results may be obtained by using the material described above, where a plurality of markings are employed even more beneficial results may be obtained if the markings are clearly distinguishable one from the other. This is accomplished by the preferred feature of having the markings coded for ease of identification.

Although beneficial results may be obtained by using the materials described, even more beneficial results will be obtained if the reference markings are numbered for ease of reference and to reduce the likelihood of error. For example, if the markings are uniformly spaced one foot apart, the number 17 will designate the 17 foot mark.

BRIEF DESCRIPTION OF THE DRAWINGS

These and other features of the invention will become more apparent from the following description in which reference is made to the appended drawings, wherein:

FIG. 1 is a perspective view of sheet of material marked in accordance with a preferred embodiment of the invention.

FIG. 2 is a perspective view of a length of material marked in accordance with a preferred embodiment of the invention.

FIG. 3 is a perspective view of a length of material marked in accordance with an alternative preferred embodiment of the invention.

FIG. 4 is a perspective view of a sheet of material marked in accordance with an alternative preferred embodiment of the invention, secured to lengths of material.

DETAILED DESCRIPTION OF THE PREFERRED EMBODIMENT

The invention will not be described with reference preferred embodiments illustrated in FIGS. 1 through 7. The invention relates to material having premarked reference markings on the material uniformlY spaced such that the markings can be used for measurement. The materials which have been selected for the purpose of illustration are materials common in the construction industry. It will be recognized that the teachings are equally applicable to other industries. The type and extent of markings will, of course, vary depending upon the desired application. The intent is to reduce the time require d during installation to measure, mark or cut the materials. For some applications the marking must be extensive to accomplish this purpose, for other applications a very elementary marking system may be used. FIGS. 1 through 7 illustrate applications and variations on the general principle.

Figure 5:
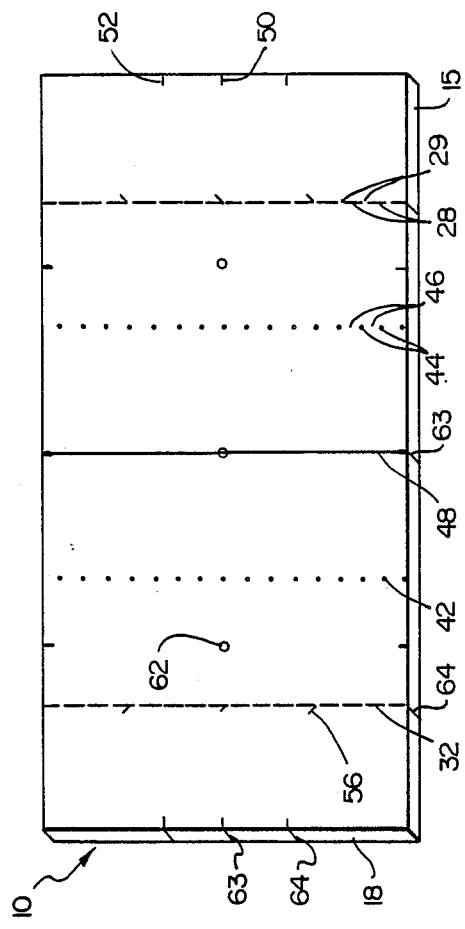
FIG. 5 is a perspective view of sheet of material marked in accordance with an alternative preferred embodiment of the invention.
Figure 7:
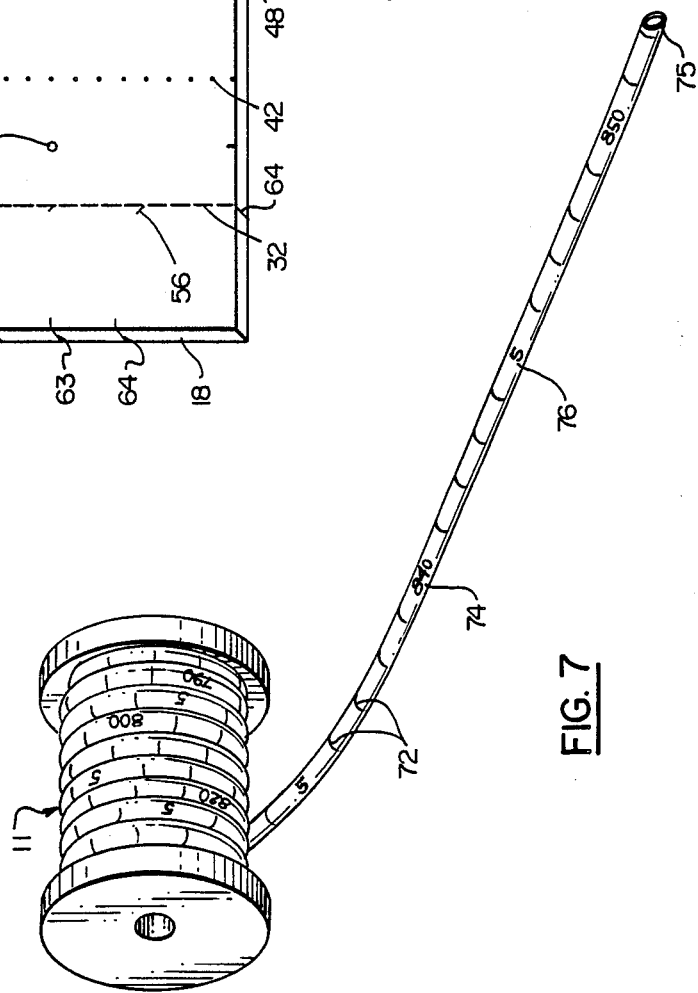
FIG. 7 is a perspective view of a roll of material marked in accordance with a preferred embodiment of the invention.
Figure 6:
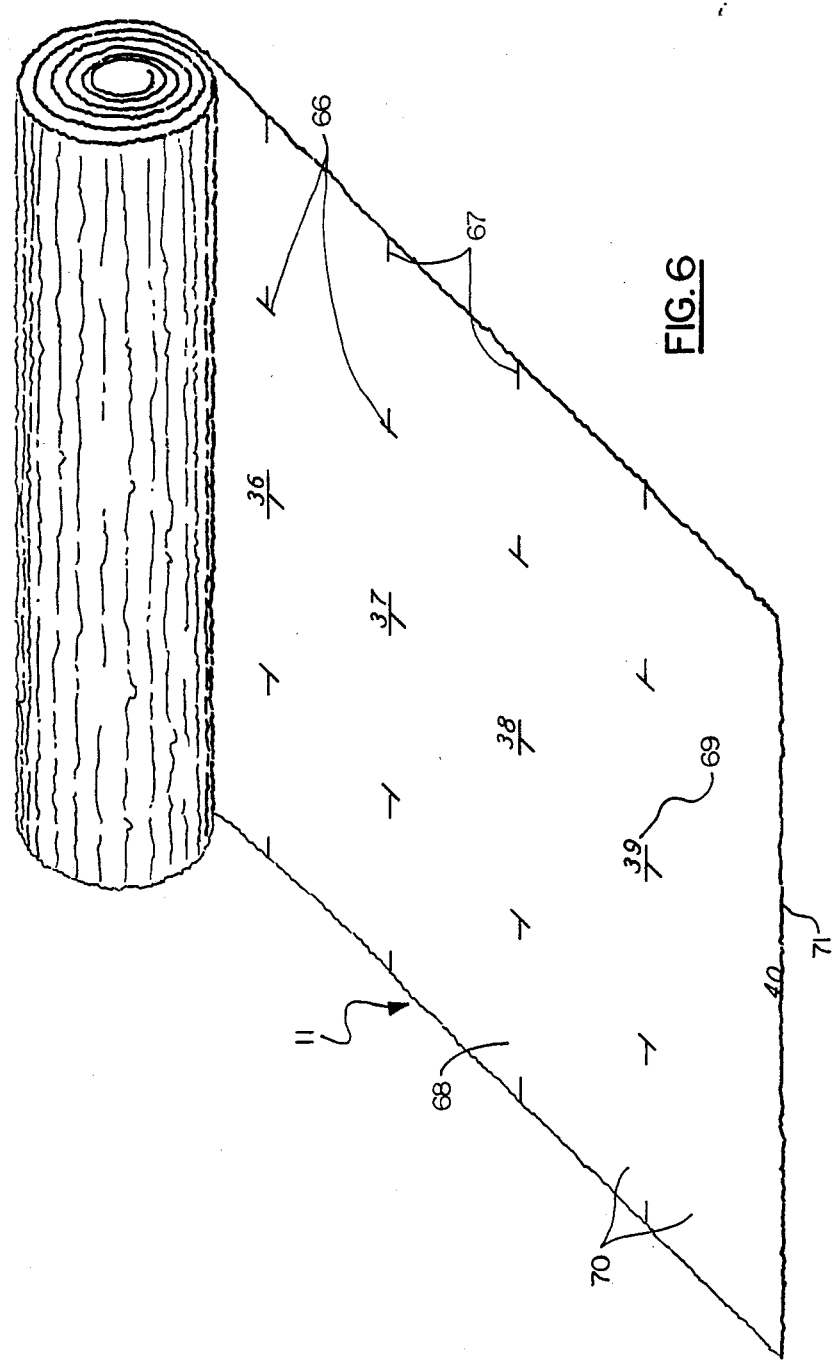
FIG. 6 is a perspective view of a roll of material marked in accordance with a preferred embodiment of the invention.

In the description which follows three types of material will be described. They are generallY designated by reference numerals 10, 11 and 12. Materials 10 are materials in the form of sheets. Materials 11 are materials in the form of rolls. Materials 12 are materials in linear lengths. The sheets of construction material 10 illustrated in FIGS. 1, 4, and 5 are plywood. The linear material 12 illustrated in FIG. 2 is a plank the dimensions of which are 2 inches in thickness, eight inches in width, and four feet in length. The linear material 12 illustrated in FIG. 3 is a stud the dimensions of which are 2 inches in thickness, four inches in width, and twenty feet in length. The roll of material 11 in FIG. 6 is carpet. The roll of material 11 in FIG. 7 is wire.

Referring to FIGS. 2 and 3, the lengths of construction framing material 12 have pairs of opposed sides 14 and 15 and are generally rectangular in crosssection. Reference markings 16 are painted on framing material 12. The markings 16 are uniformly spaced and divide material 12 into units of standard size which can be used as a reference by the workman to determine a relative position without measurement. In FIG. 2, markings 16 are coded so that a different type of marking is used to identify markings of differing spacing. The smallest fractional unit spacing is an inch represented by a short dash 13. Every three units the spacing is marked by lengthened dashes 20 representing a composite measurement of three inches. Every 12 units lines 17 extend transversely across side 14 representing a composite measurement of 12 inches. In FIG. 3, dashes 13 are placed at ½ foot intervals. Every second unit has line 17 extending transversely across side 14 representing a composite measurement of one foot. In FIG. 2, an adjacent side 15 has a plurality of dashes 19 at six inch intervals and a plurality of lines 21 at 12 inch intervals. In FIG. 3, an adjacent side 15 has a pluralitY of lines 21 at one foot intervals. In FIG. 3, reference numerals 73 are positioned on every fourth one of lines 17.

Referring to FIG. 1, a grid of reference markings 22 is superimposed on one wide 14 of sheet of construction material 10. Grid 22 has a plurality of longitudinal markings 24 and transverse markings 26. Markings 24 and 26 have dashes 27 at one foot intervals dividing grid 22 into one foot squares. Where dashes 27 on longitudinal markings 24 and dashes 27 on transverse markings 26 intersect a cross is formed. Reference markings 24 and 26 have ruled markings 32 at 16 inch intervals dividing grid 22 into 16 inch squares. Ruled markings 32 consist of dashes 28 which represent a fractional unit of measure separated by spaces 29 of equal size. In this case the fractional unit of measure is inches. Arrows 30 are positioned at spaced intervals which correspond to a composite unit of measure. The composite unit of measure consists of a number of fractional units. In this case the composite unit is 12 inches. Lines 34 are drawn at 24 inch intervals divide grid 22 into 24 inch squares. Dashes 27 are colour coded red, and ruled markings 32 are colour coded green so as to be readily distinguishable. Lines 34 are colour coded red as the positioning of lines 34 inevitably corresponds with the positioning of dashes 27. Where ruled markings 32 and lines 34 correspond, the resulting line is comprised of dashes 28 which are colour coded with both the colours green and red. On adjacent sides 15 and 18, sheet of material 10 is marked with green lines 36 at 16 inch intervals and red lines 38 at 24 inch intervals.

Referring to FIG. 4, sheet of construction material 10 is illustrated with a simplified form of marking particularly suited for cutting and nailing sheeting, the use of which will be hereinafter described. In framing the wall illustrated with framing material 12, the bottom plate 100 has transverse markings 101 at 16 inch intervals to facilitate the positioning of framing material 12 and the squaring of the wall. Sheeting 10 is then applied to the wall. Side 14 of sheet 10 has only transverse markings 26. Transverse markings 26 are ruled lines 32 consisting of dashes 28 made of fractional units two inches in length, and separated by spaces 29 of equal length. An arrow 30 is positioned at the end of every three dashes indicating a composite unit of 12 inches. Adjacent sides 15 of sheet of material 10 is marked with green lines 36 at 16 inch intervals.

Referring to FIG. 5, there is illustrated a sheet of material which has some alternate forms of marking. Sheet of material 10 has two groups of reference markings distinguishable by colour coding. The red markings divide sheet of material 10 into 24 inch strips. The green markings divide sheet of material 10 into 16 inch strips. There are two types of red markings, peripheral dashes 50 and circles 62. There are five types of green markings, namely; ruled markings 32 and 42, peripheral dashes 52, and solid line 48. Ruled markings 42 consist of a plurality of dots 44. Spaces 46 between dots 44 are units of measurement, in this case each space represents 3 inches. Solid line 48 is positioned to divide sheet of material 10 into two equal halves. Peripheral dashes 52 are positioned at 16 inch intervals. Ruled markings 32 consist of a plurality of dashes 28. Each of dashes 28 are fractional units 2 inches long, and are separated by spaces 29 of equal length. Every third dashes has an angular extension 56 which designates a composite unit of measure, namely a foot. Adjacent sides 15 and 18 have markings 63 which are positioned to divide sheet of material 10 into two equal halves, and markings 64 which are positioned at 16 inch intervals.

Referring to FIG. 6, roll of material 11 has a plurality of longitudinal dashes 66 and transverse dashes 67 on backing 68. Dashes 66 and 67 divide backing 68 into a plurality of rows of squares 70 forming a checkerboard pattern. Each square represents a square yard. A linear number 69 representing the length of the carpet remaining appears in each row; numbered consecutively starting with a point of reference at the centre of the roll (not shown) and continuing to the peripheral edge 71 of the roll.

Referring to FIG. 7, roll of material 11 has a plurality of markings 72 positioned at one foot intervals along its length. A reference numeral 74 is positioned every 10 feet; numbered consecutively starting with a point of reference at the centre of the roll (not shown) and continuing to the free end 75 of the roll. Between reference numerals 74 there appears a mid-point reference 76, in this case the number 5. Mid-point reference 76 designates a five foot interval between two adjacent reference points 74.

The use and operation of the invention will not be described with reference to FIGS. 1 through 7. The tYpe and extent of marking required depends upon the application. Referring to FIGS. 2 and 3, by reference to reference markings 16 the workman can without measuring locate a specific point along framing materials 12 limited only by the size of the fractional units of measure. By way of illustration, if the workman wishes to cut framing material 12 to a length of four feet, he places his saw on the fourth line 17. He knows in advance that framing materials 12 have been ruled such that the distance between lines 17 conforms to a unit of measure, namely feet. Where long lengths of materials are used reference numerals 73 can be placed adjacent the markings on linear framing materials 12 to further assist the workman in determining the positioning of the mark on the material relative to a point of reference, which would usually be one of the peripheral edges. In making his cut the workman aligns his saw with the fourth line 21 on adjacent side 15 to ensure the resulting cut is square rather than on an angle. Referring to FIG. 2, if the cut were to be made at three feet six inches, the workman can similarly align his saw, knowing that dashes 20 on side 14 are at three inch intervals and dashes 19 on adjacent side 15 are at six inch intervals.

When cutting framing material 12 approximately ⅛ inch of the material is lost in the cutting process. This being the case it is preferred if the cut is made right on the line, so the remaining reference markings 16 on framing material 12 will remain substantially accurate. Once framing material 12 is secured in place, reference markings 16 can be used as a guide in positioning cross-members, duct work and the like.

Referring to FIG. 1, the location of any point on sheet material 10 may be ascertained with reference to longitudinal markings 24, transverse markings 26 or by extending longitudinal 24 and transverse 26 markings on grid 22 to determine a point of intersection. Ruled markings 32 permit points to be determined with precision as dashes 28 are all of uniform size and are separated by spaces 29 of equal size, namely one inch. Ruled markings 32 have arrows 30 at regular intervals. The distance between arrows 30 conform to a one foot. By way of illustration, if the workman must make a cut to divide the eight foot length of sheet 10 into any one foot increment, he may do so solely by reference to transverse markings 28. If the required increment is four feet, he positions his saw on the green and red line where ruled markings 32 and lines 34 correspond and cuts along the line. If the cut required were to divide the four foot width of sheet 10 to obtain a piece two foot six inches wide, he would do so with reference to both longitudinal markings 24 and transverse markings 26. He would find the two foot reference mark designed by red colour coded line 34. He would then place his saw six inches to one side of the two foot mark, determining placement with reference to dashes 28 and spaces 29 on rule d markings 32 of transverse markings 26 each of which he knows to be precisely one inch in length. As he proceeds with his cut he visually checks his positioning with reference to each of reference markings 32 which his saw blade crosses. If desired the workman may run a pencil line using a straight edge or a chalk line where the cut is not positioned right on a transverse 26 or longitudinal 24 marking. If he chooses to do so, he can readily determine the positioning of the further marking with reference to grid 22. If an opening must be cut in sheet 10, such as an opening for a window, the boundaries of the window can readily be located with reference to grid 22, without the need for use of a measuring instrument. The opening can then be cut out with or without the use of additional markings as a reference, depending upon the skill and preference of the workman.

Referring to FIG. 4, when the workman nails sheet material 10 to framing material 12, he takes care to align framing material 12 with lines 36 which are spaced sixteen inches apart. Where the framing material 12 is bowed, as sometimes occurs, he applies pressure to framing material to bring it into alignment prior to nailing in place. It is the practise in the industrY to nail sheet 10 to framing material 12 in a superficial manner and then to later go back to nail sheet 10 in a more secure manner. When the workman goes back to more securely nail sheet 10 framing material 12 is completely hidden from view by a plurality of sheets 10. The present invention assists with such nailing as transverse markings 26 clearly indicate the positioning of framing materials 12. Also when cutting sheet 10, transverse markings 26 are positioned in the most likely place where cutting will be required during sheeting. In FIG. 4, framing materials 12 have been spaced sixteen inches on centre, and as such nailing is performed along each of ruled lines 32. Dashes 28 and spaces 29 being of uniform dimension permits nails, designated by reference numeral 78, to be evenly spaced along ruled lines 32. Evenly spaced and precisely centered and aligned nailing using ruled lines 32 as a guide, is beneficial as it reduces the number of nails required, strengths the wall by more securely attaching the sheet to the framing, and saves time by reducing the amount of taping and sanding during interior finishing.

Referring to FIG. 5, the sheet of material 10 illustrated would be used in a similar fashion to FIG. 1, previously described. It should be noted that a completed grid is not a necessity, for where there are two transverse lines which are ruled, horizontal lines may be marked as required with reference to the ruled lines.

Referring to FIGS. 6 and 7, a common problem with rolls of material 11, is that they can be awkward to measure and mark for cutting, and once a quantity has been taken from the roll the workman never can be certain how much material he has left. Referring to FIG. 6, the workman merely must note the reference marking 69 along peripheral edge 71 and calculate at which of the subsequent reference markings 69 he must make his cut. When the desired one of reference markings 69 has been located he makes his cut along transverse markings 67. If material 11 must be cut to fit an irregular shaped area this can be accomplished by reference both to transverse markings 67 and longitudinal markings 66. The amount left on roll of material 11 will be readily ascertainable with reference to reference marking 69 on peripheral edge 71. Referring to FIG. 7, the workman notes the marking on free end 75 of roll of material 11. He then calculates at which of markings 72, 74 or 76 he must make his cut to obtain the quantity of material he requires. Once at the selected one of markings 72, 74, or 76 he makes his cut. The marking 72, 74 or 76 remaining on free end 75 of roll of material 11 indicates for purposes of inventory control the amount of material remaining on the roll.

It will be apparent to one skilled in the art the time saving which can be obtained through use of the present invention. It will also be apparent to one skilled in the art that the materials maY be marked in alternative waYs. It will also be apparent to one skilled in the art that the present invention facilitates the nailing of sheets of construction material 10. It will also be apparent to one skilled in the art that having the nail holes aligned with reference to lines 35 and spaced in an precise fashion with reference to dashes 28 reduces the time required to tape drywall installed on interior walls. It will also be apparent to one skilled in the art that the present invention will reduce the amount of time required to align and install siding and roofing materials on building exteriors. It will further be apparent to one skilled in the art the advantages provided by the present invention wherever aligning, measuring, marking or cutting is required. It will be apparent to one skilled in the art, that the reference marking can be abbreviated and need not form a comprehensive grid. It will be apparent to one skilled in the art that the markings can also be used to designated the finished side of lumber which is finished on only one side or the orientation of materials which should be positioned a certain way. It will be apparent to one skilled in the art that nailing along lines 35 reduces the risk of accidental damage to plumbing and wiring within interior walls. It will be apparent to one skilled in the art that nailing along lines 35 will result in more secure nailing. It will be apparent to one skilled in the art that although the invention was described with reference to the construction industry, the teachings of the invention will be equally applicable to many other industries which are involved with fabrication and manufacture of products. It will finally be apparent to one skilled in the art that modifications may be made without departing from the scope of the invention.

The embodiments of the invention in which an exclusive property or privilege is claimed are defined as follows:

1. In combination:
   a. a roll of material for use in fabrication; and
   b. reference markings on the roll of material spaced uniformly such that the markings can be used for measurement, the roll of material having reference numbers at regular interval adjacent the reference markings, such that the reference numbers designate the positioning of the adjacent reference marking relative to a primary reference point at the centre of the roll of material.

2. The combination as defined in claim 1, wherein the primary reference point has a value of zero.

3. The combination as defined in claim 1, wherein the reference numbers are positioned toward the centre of the roll of material in relation to the reference markings, such that when a cut is made along a reference marking the adjacent reference numeral remains on the roll of material.

4. The combination as defined in claim 1, wherein the orientation of the reference numbers on the roll of material is such that the reference numbers successively increase from the primary reference point.

* * * * *